United States Patent Office 2,761,215
Patented Sept. 4, 1956

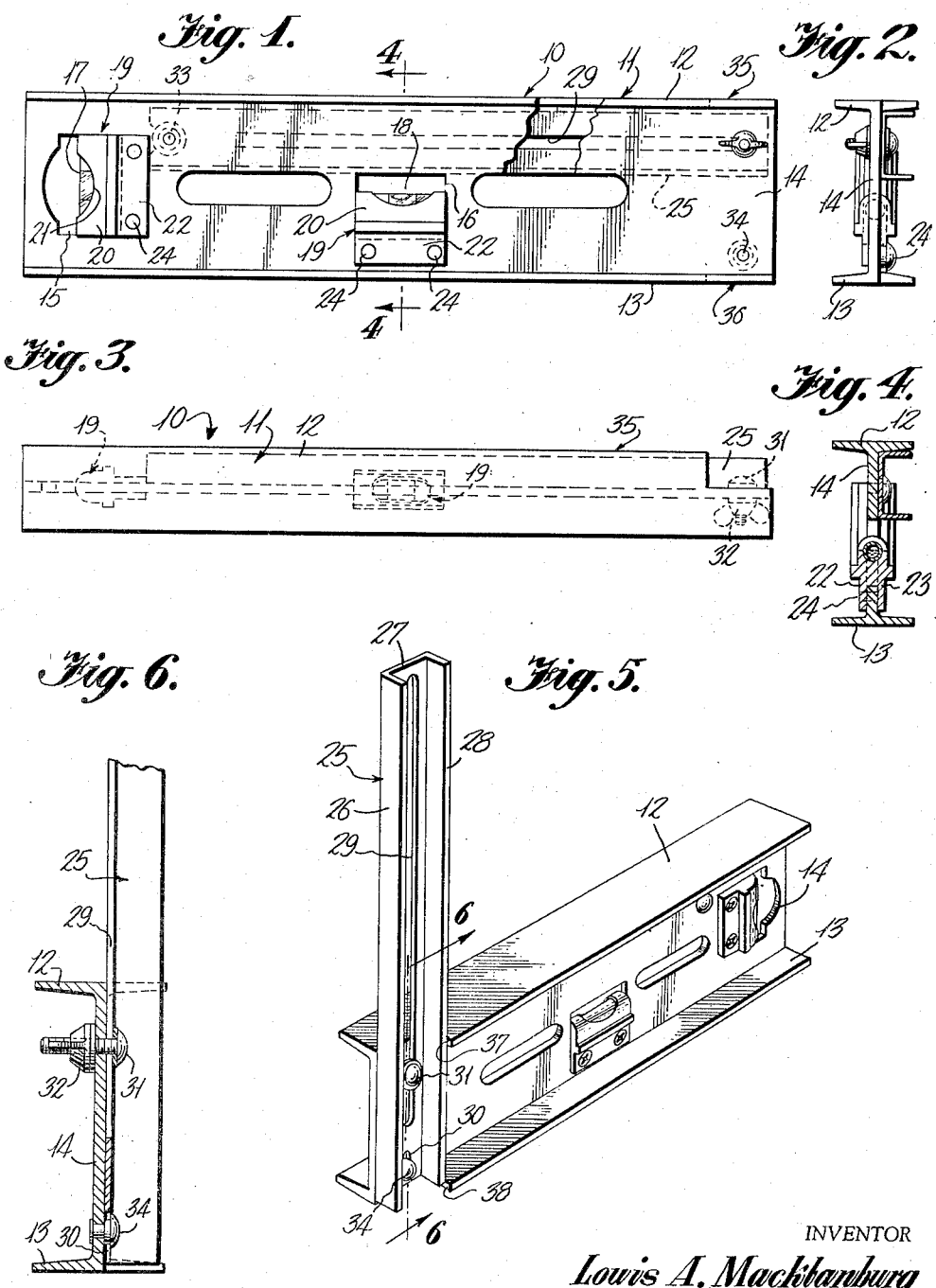

2,761,215

COMBINATION LEVEL AND TRY SQUARE

Louis A. Macklanburg, Oklahoma City, Okla.

Application June 20, 1955, Serial No. 516,481

1 Claim. (Cl. 33—89)

The present invention relates in general to carpentry and machinery tools, and more particularly to a combination level and try square.

An object of the present invention is the provision of an improved level especially intended for use by carpenters, machinists, builders and the like, which level is provided with means for permitting its use as a try square when desired.

Another object of the present invention is the provision in a level of novel means for folding an elongated bar associated therewith from a position projecting perpendicular to the longitudinal axis of the level to a position nested with the level in alignment with the longitudinal axis thereof.

Another object of the present invention is the provision of a combination level and square constructed in such a manner as to render the same highly durable and capable of withstanding the shocks and wear to which such tools are subjected during use.

Another object of the present invention is the provision of a combination level and try square wherein the component forming the perpendicularly projecting arm of the try square is shiftable from the projecting position into a nested position relative to the level and is adjustably associated with the level in such a manner as to facilitate highly accurate positioning of the arm in perpendicular relation to the longitudinal axis of the level.

Other objects, advantages and capabilities of the present invention will become apparent from the following detail description, taken in conjunction with the accompanying drawing, illustrating one preferred embodiment of the invention.

In the drawing:

Figure 1 is a side elevation of a combination level and try square embodying the present invention, with the component forming the projecting arm illustrated in nested condition in alignment with the level block;

Figure 2 is an end elevation of the combination level and try square, viewed from the right hand end of Figure 1;

Figure 3 is a top plan view of the combination level and try square, with the adjustable arm shown in nested position;

Figure 4 is a vertical transverse section view taken along the lines 4—4 of Figure 1;

Figure 5 is a perspective view of the combination level and try square embodying the present invention, the adjustable arm being shown in right angular relation with the level block in the position of use as a try square; and Figure 6 is a vertical transverse section view taken along the lines 6—6 of Figure 5.

Referring to the drawing, wherein like reference characters designate corresponding parts throughout the several figures, the combination level and try square, generally indicated by the reference character 10, is provided with a level block 11 which is constructed in the form of an elongated metallic I-beam member of preselected length which, in the preferred embodiment, is of aluminum or aluminum alloy. The I-beam forming the level block 10 is provided with the usual top and bottom flanges 12 and 13, respectively, interconnected by an integral vertical web 14. The I-beam level block 11 is designed for use as a straightedge and level, and to this end the oppositely facing surfaces of the top and bottom flanges 12 and 13 of the level block 11 are accurately machined to provide precisely parallel true straight edges. The web portion 14 is provided with a recess 15 adjacent one end of the level block 11 and a recess 16 intermediate the ends of the level block 11 to accommodate a plumb vial 17 and a level vial 18 of the usual form filled with liquid to leave a small bubble therein and form a spirit level. The plumb vial 17 and level vial 18 are each supported in identical vial housings 19 having tubular housing portions 20 enclosing vials 17 and 18 each provided with semicircular notches 21 through which the bubble in the vials are visible, the tubular housing portions 20 terminating each in a pair of parallel leg portions 22, 23 spaced apart a distance equal to the width of the web 14 and designed to straddle the web portions bounding one edge of the recesses 15 and 16 and being tapped to receive screws 24 for fixing the vial housings 19 in their respective recesses.

A try square arm 25 is pivotally associated with the level block 11, and is formed of a channel-shaped bar 26 of material similar to that of the level block 11 of a length somewhat less than the total longitudinal extent of the level block 11, the channel-shaped bar having an intermediate web portion 27 and parallel channel sides 28. The web 27 is provided in alignment with its longitudinal medial axis, an elongated slot 29 extending over the major portion of the length of the bar 26 and terminating inwardly of each end thereof, and a notch 30 opening through one end of the bar 26 and in longitudinal alignment with the slot 29. A bolt 31 extending through the slot 29 and an accommodating aperture in the web 14 of the level block 11 and threaded into a wing nut 32 bearing against the other surface of the web 14 forms a pivot for the try square arm 25 on the level block 11 to permit the try square arm to be shifted between the positions illustrated in Figures 1 and 5 of the drawing. Locating studs 33 and 34 threaded into accommodating apertures in the web 14 of the level block 11 are positioned to be seated in the end opening notch 30 of the try square arm 25 at the two perpendicularly related positions of adjustment to respectively locate the try square arm 25 in alignment with the longitudinal axis of the level block 11, as illustrated in Figure 1, and in perpendicular relation thereto, as illustrated in Figure 5. As an additional facility to insure precise location of the try square arm 25 perpendicular to the axis of the level block 11 and maintain such precision of location of the try square arm 25 throughout long periods of use of the tool, the portions of the top and bottom flanges 12 and 13 extending to one side of the interconnecting web 14 and adjacent one end thereof are cut away, as indicated at 35 and 36, to receive the channel-shaped bar 26 of the try square arm therein and provide shoulders 37 and 38 against which the adjacent channel side 28 is positioned in intimate contact with the shoulders when the wing nut 32 is tightened to frictionally secure the bar 26 in right angular relation with the longitudinal axis of the level block and insure precise retention of the try square arm 25 in such right angularly related position.

In operation of the combination level and try square 10, the try square arm 25 which is normally carried in the nested position illustrated in Figure 1 may be readily adjusted to the projecting position of Figure 5 for use as a try square by loosening the wing nut 32, shifting the channel-shaped bar 26 to the right, as viewed in Figure 1, to shift the pivot bolt 31 substantially through the length of the slot 29, rotating the bar 26 through substantially 90 degrees in a direcion shifting the notch 30 toward the locating stud 34, then shifting the bar 26 longitudinally downwardly to seat the stud 34 within the notch 30 and the adjacent channel side 28 against the locating shoulders 37 and 38, and then tightening the wing nut 32 to frictionally hold the channel-shaped bar 26 in perpendicularly projecting position. The try square arm 25 is returned to the nested position of Figure 1 by reversing this procedure.

While only one preferred embodiment of the invention has been particularly shown and described, it is apparent that other various modifications may be made in the invention without departing from the spirit and scope thereof, and it is desired, therefore, that only such limitations shall be placed thereon as are imposed by the prior art and are set forth in the appended claim.

I claim:

A combination level and square comprising an elongated level block formed of an I-beam section having parallel top and bottom flanges and an interconnecting web, spirit level vials supported in perpendicularly related position on said web to form plumb and level indicators, an elongated try square arm formed of a channel-shaped bar having a web portion terminating marginally in parallel channel sides adapted to be alternatively positioned in nested relation alongside said web between said flanges and at right angles to said flanges, the web portion of said arm having a slot extending along the major portion of the length thereof along the medial longitudinal axis of said arm and a notch opening through one end of said arm in longitudinal alignment with the axis of said slot, a pivot belt supported in the web of said level block and extending through said slot to provide a slidable and pivotal support for said arm, adjustable means associated with said bolt for frictionally locking the web portion of said arm against the web of said level block to retain said arm at desired positions of adjustment, headed studs supported on said web of said level block in right angular relation to said pivot bolt to be selectively seated in said notch and to locate said arm in cooperation with said pivot bolt at right angularly related positions of adjustment of said arm, said top and bottom flanges having corresponding vertically aligned cut-away portions adjacent one longitudinal end thereof and extending entirely to one side only of said web to provide a pair of vertically aligned shoulders disposed to bear against one of the channel sides of said arm at appositely spaced points relative to said pivot bolt when said arm is located in right angular relation to the longitudinal axis of said web of said block.

References Cited in the file of this patent
UNITED STATES PATENTS

| | | |
|---|---|---|
| 419,615 | Stilwell | Jan. 14, 1890 |
| 792,930 | Rowan | June 20, 1905 |
| 806,518 | Breul | Dec. 5, 1905 |
| 913,703 | Darter | Mar. 2, 1909 |
| 1,038,008 | Shotwell | Sept. 10, 1912 |
| 1,128,143 | Ickenroth | Feb. 9, 1915 |
| 1,211,458 | Leavens | Jan. 9, 1917 |
| 1,394,323 | Matson | Oct. 18, 1921 |